United States Patent

Leichty et al.

[19]

[11] Patent Number: 6,041,060
[45] Date of Patent: Mar. 21, 2000

[54] COMMUNICATIONS CELL SCHEDULER AND SCHEDULING METHOD FOR PROVIDING PERIODIC ACTIVITIES

[75] Inventors: Philip Lynn Leichty, Rochester; Albert Alfonse Slane, Oronoco, both of Minn.

[73] Assignee: International Business Machines Corporation, Armonk, N.Y.

[21] Appl. No.: 08/846,565

[22] Filed: Apr. 30, 1997

[51] Int. Cl.[7] .............................. H04L 12/28; H04L 12/56
[52] U.S. Cl. ............................................. 370/412; 370/229
[58] Field of Search ...................................... 370/398, 352, 370/353, 401, 395, 471, 473, 229, 230, 231, 235, 236, 412, 422, 428, 429, 392, 389; 395/842, 846

[56] References Cited

U.S. PATENT DOCUMENTS

| | | | |
|---|---|---|---|
| 5,274,768 | 12/1993 | Traw et al. | 395/275 |
| 5,367,639 | 11/1994 | Sodos | 395/275 |
| 5,533,020 | 7/1996 | Byrn et al. . | |
| 5,548,587 | 8/1996 | Bailey et al. . | |
| 5,610,921 | 3/1997 | Christensen | 370/395 |
| 5,625,625 | 4/1997 | Oskouy et al. | 370/395 |
| 5,822,612 | 10/1998 | Thomas et al. | 395/826 |

OTHER PUBLICATIONS

U.S. patent application Ser. No. 08/823,155; entitled "An Earliest Deadline First Communications Cell Scheduler and Scheduling Method for Transmitting Earliest Deadline Cells First", by Gary S. Delp et al.; filed Mar. 25, 1997; IBM Docket No. R0996–150.

U.S. patent application Ser. No. 08/846,565; entitled "Communications Cell Scheduler and Scheduling Method for Providing Proportional Use of Network Bandwidth"; by Gary S. Delp et al.; filed Mar. 25, 1997; IBM Docket No. R0996–151.

*Primary Examiner*—Ajit Patel
*Attorney, Agent, or Firm*—Joan Pennington

[57] ABSTRACT

A communication cell scheduler and scheduling method are provided to efficiently provide periodic activities and predetermined events. A timer descriptor is enqueued to a cell scheduler timing wheel. A timer expiration for the timer descriptor is identified and an address for a DMA descriptor is fetched from the timer descriptor. Then the DMA descriptor is enqueued to a DMA engine to execute the DMA descriptor.

14 Claims, 8 Drawing Sheets

FIGURE 1A
TIMING DESCRIPTOR 150
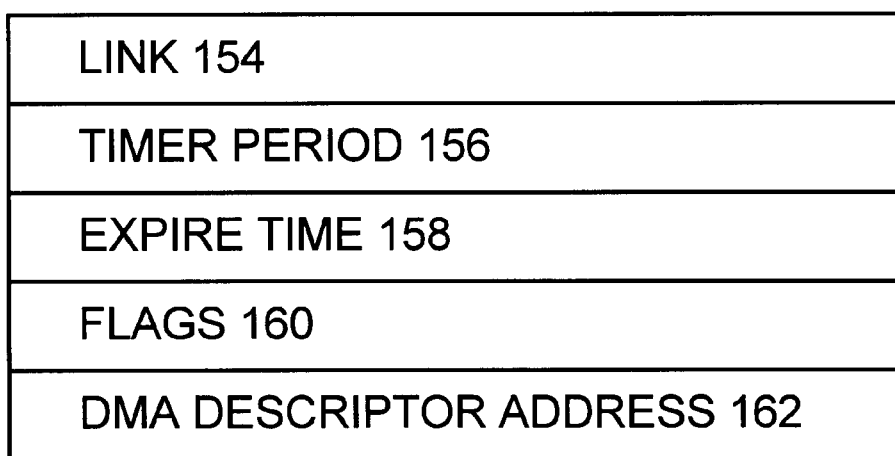
DMA DESCRIPTORS 152
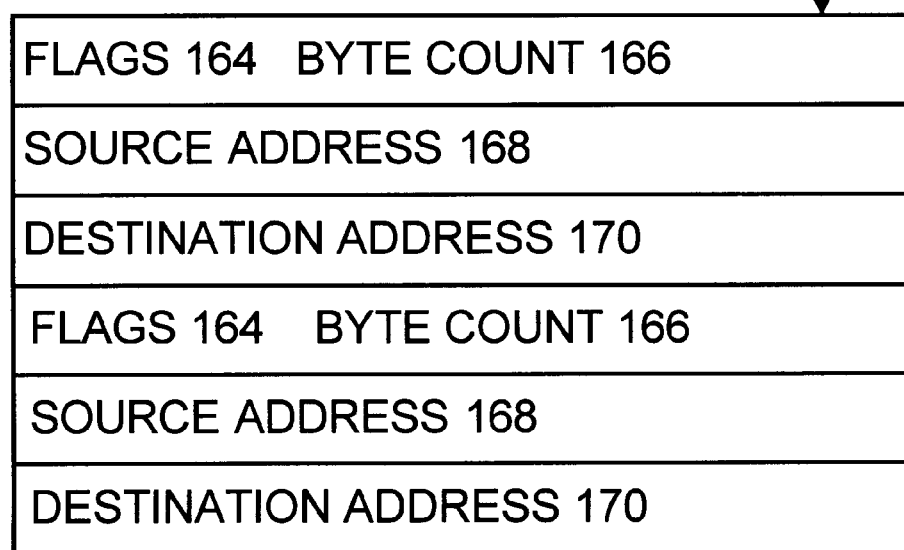

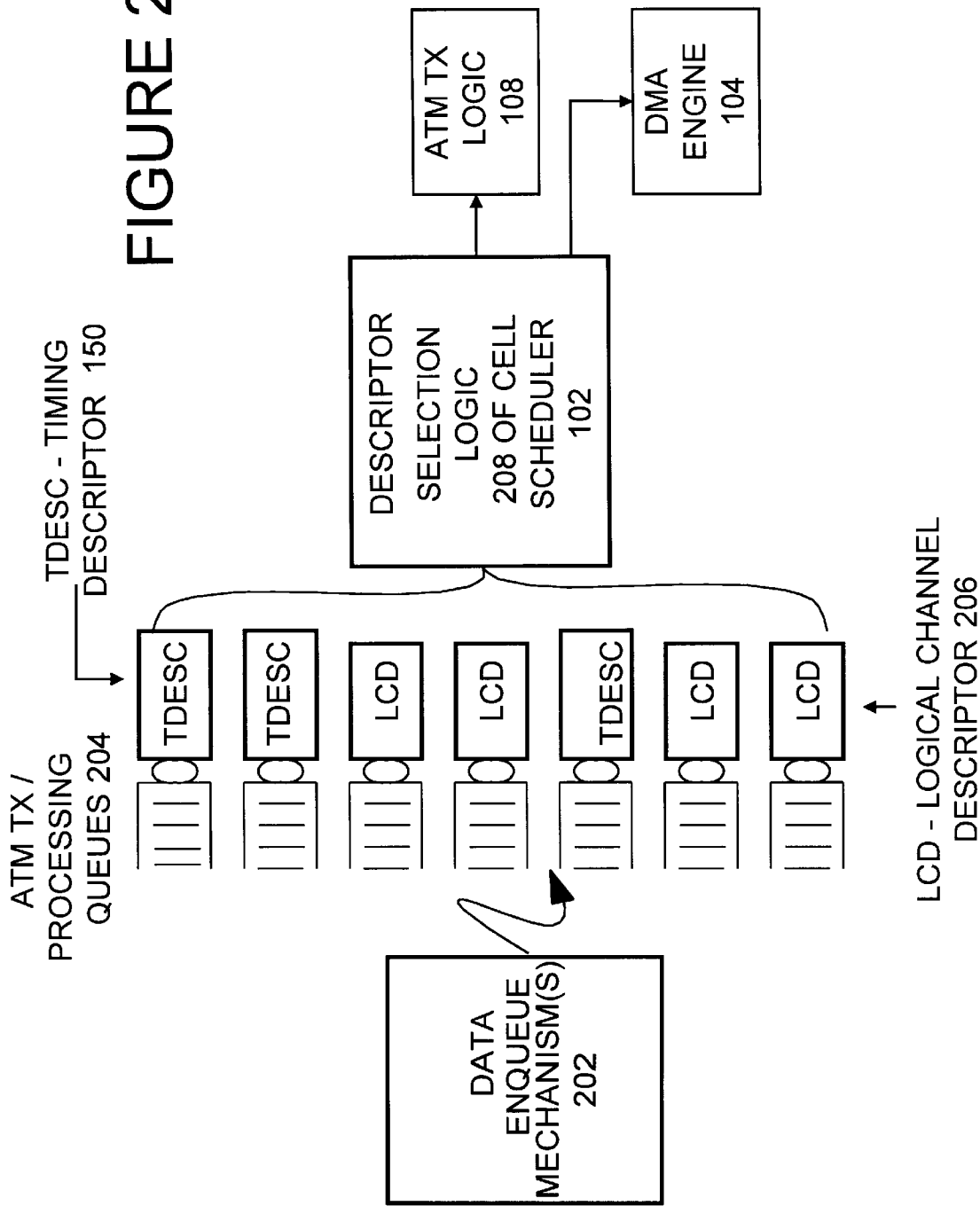

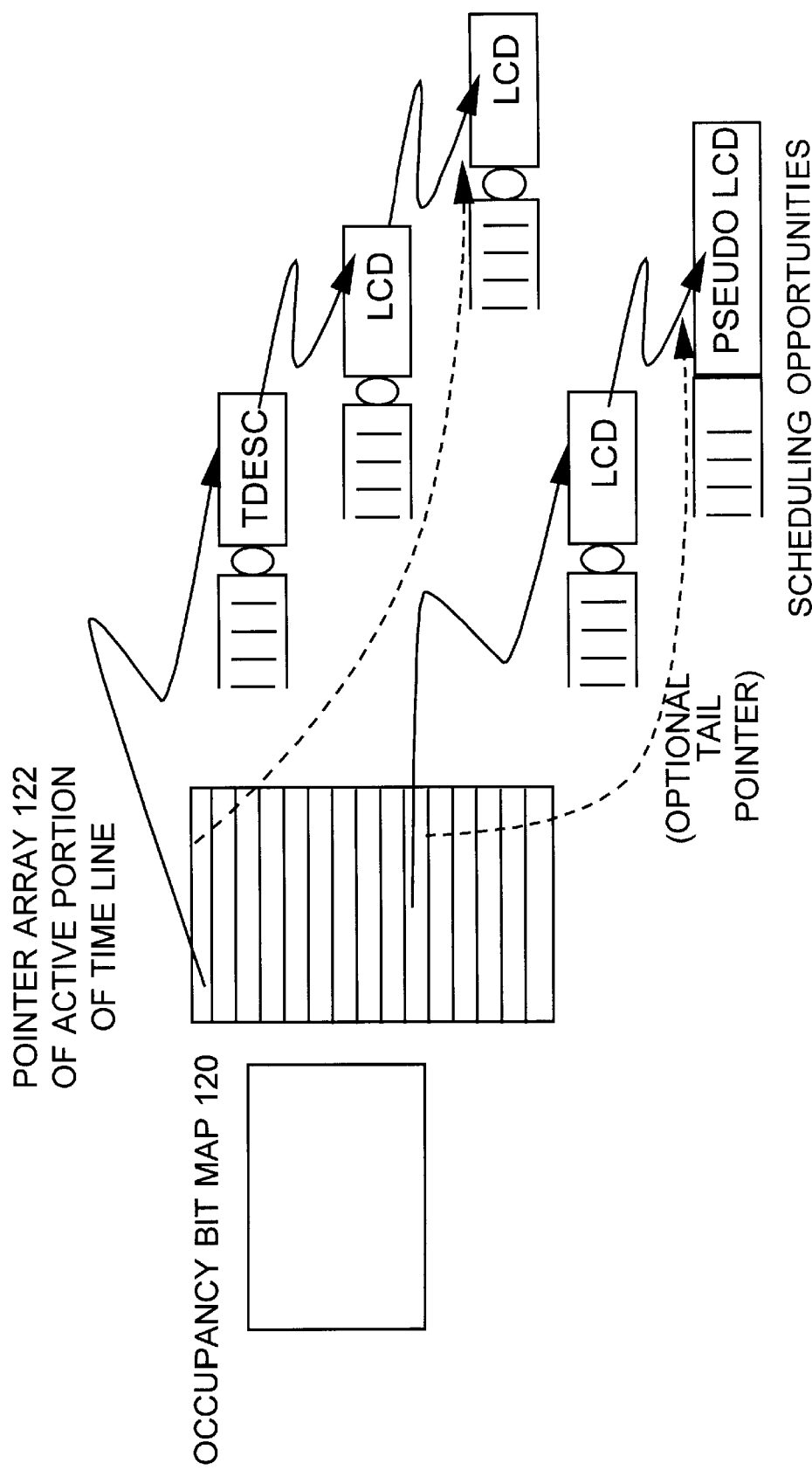
FIGURE 3  CELL SCHEDULER 102
DATA STRUCTURES INCLUDING TIMING WHEEL

FAST AND SLOW TIMING WHEELS

FIGURE 6B
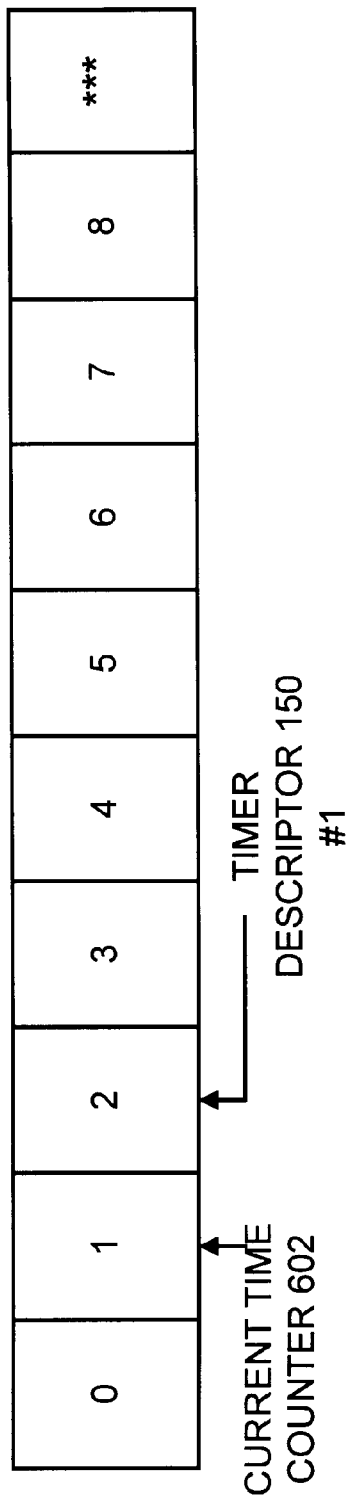
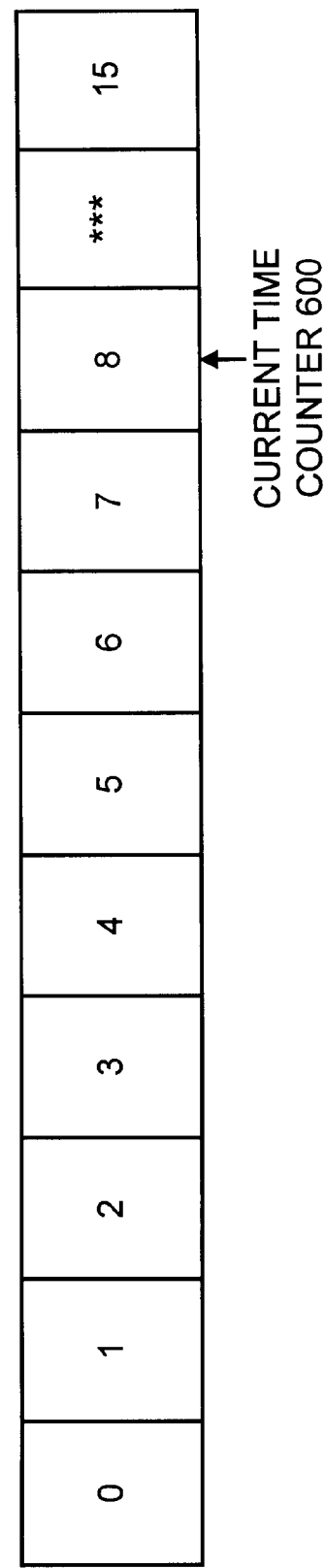

COMMUNICATIONS CELL SCHEDULER AND SCHEDULING METHOD FOR PROVIDING PERIODIC ACTIVITIES

FIELD OF THE INVENTION

The present invention relates generally to the data processing field, and more particularly, relates to a communications cell scheduler and scheduling method for providing periodic activities and predetermined events.

Description of the Prior Art

It is quite common to need to do certain actions on a periodic basis, or at a specified time in the future. For example, multiple timers are needed, statistics are gathered, a commercial needs to be spliced in at a particular time. Typically this is all done in code.

An Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. ATM networks are designed to support the integration of high quality voice, video, and high speed data traffic. ATM networks use fixed size cells as a unit of transmission. As technology increases, it is expected that the Asynchronous Transfer Mode (ATM) technology and ATM networks will supply much of the need for high speed multimedia.

In ATM networks, one known algorithm called the leaky bucket algorithm has been used to determine when a cell for a single session may be transmitted. This leaky bucket algorithm may be used to determine if a cell is allowed to be transmitted for any single session at a given time. Scheduling a multiplicity of sessions can be provided by running the leaky bucket algorithm at any time for all the sessions to determine which sessions may be scheduled for transmission at that time. Then, cells from these sessions may be scheduled based on their assigned priorities. The leaky bucket algorithm is described in ATM Forum Technical Committee Traffic Management Specification, Version 4.0 (af-tm-0056.000) April, 1996.

A method and apparatus for scheduling the transmission of cells in a number of data streams over a common communications link is disclosed in U.S. Pat. No. 5,533,020, entitled ATM CELL SCHEDULER, issued Jul. 2, 1996 to Byrn et al., and assigned to the present assignee. The subject matter of the above-identified patent is incorporated herein by reference. Other improved cell schedulers and scheduling methods are disclosed in copending patent applications Ser. No. 08/893,155, filed on Mar. 25, 1997, entitled: AN EARLIEST DEADLINE FIRST COMMUNICATIONS CELL SCHEDULER AND SCHEDULING METHOD FOR TRANSMITTING EARLIEST DEADLINE CELLS FIRST, by Gary S. Delp et al., and assigned to the present assignee and Ser. No. 08/846,565, filed on Mar. 25, 1997, entitled: COMMUNICATIONS CELL SCHEDULER AND SCHEDULING METHOD FOR PROVIDING PROPORTIONAL USE OF NETWORK BANDWIDTH, by Gary S. Delp et al., and assigned to the present assignee. The disclosures of the above-identified patent applications are incorporated herein by reference.

It would be advantageous to have a communication cell scheduler and scheduling method to efficiently provide periodic activities and predetermined events.

SUMMARY OF THE INVENTION

A principal object of the present invention is to provide an improved communication cell scheduler and scheduling method to efficiently provide periodic activities and predetermined events. Other important objects of the present invention are to provide such improved communication cell scheduler and scheduling method substantially without negative effects and that overcome some disadvantages of prior art arrangements.

In brief, an improved communication cell scheduler and scheduling method are provided to efficiently provide periodic activities and predetermined events. A timer descriptor is enqueued to a cell scheduler timing wheel. A timer expiration for the timer descriptor is identified and an address for a DMA descriptor is fetched from the timer descriptor. Then the DMA descriptor is enqueued to a DMA engine to execute the DMA descriptor.

BRIEF DESCRIPTION OF THE DRAWING

The present invention together with the above and other objects and advantages may best be understood from the following detailed description of the preferred embodiments of the invention illustrated in the drawings, wherein:

FIG. 1A is a chart illustrating a timer descriptor and a DMA descriptor for a periodic activity or a predetermined event used by a cell scheduler included in the adapter of the preferred embodiment of FIG. 1;

FIG. 2 is a block diagram representation illustrating the operation of a cell scheduler of the preferred embodiment of FIG. 1;

FIG. 3 is a schematic and block diagram representation illustrating data structures including a timing wheel of the cell scheduler of the preferred embodiment of FIG. 1;

FIGS. 6A and 6B are charts illustrating operation of timing wheels of the cell scheduler of the preferred embodiment of FIG. 1.

DETAILED DESCRIPTION OF THE PREFERRED EMBODIMENTS

Figure 1:
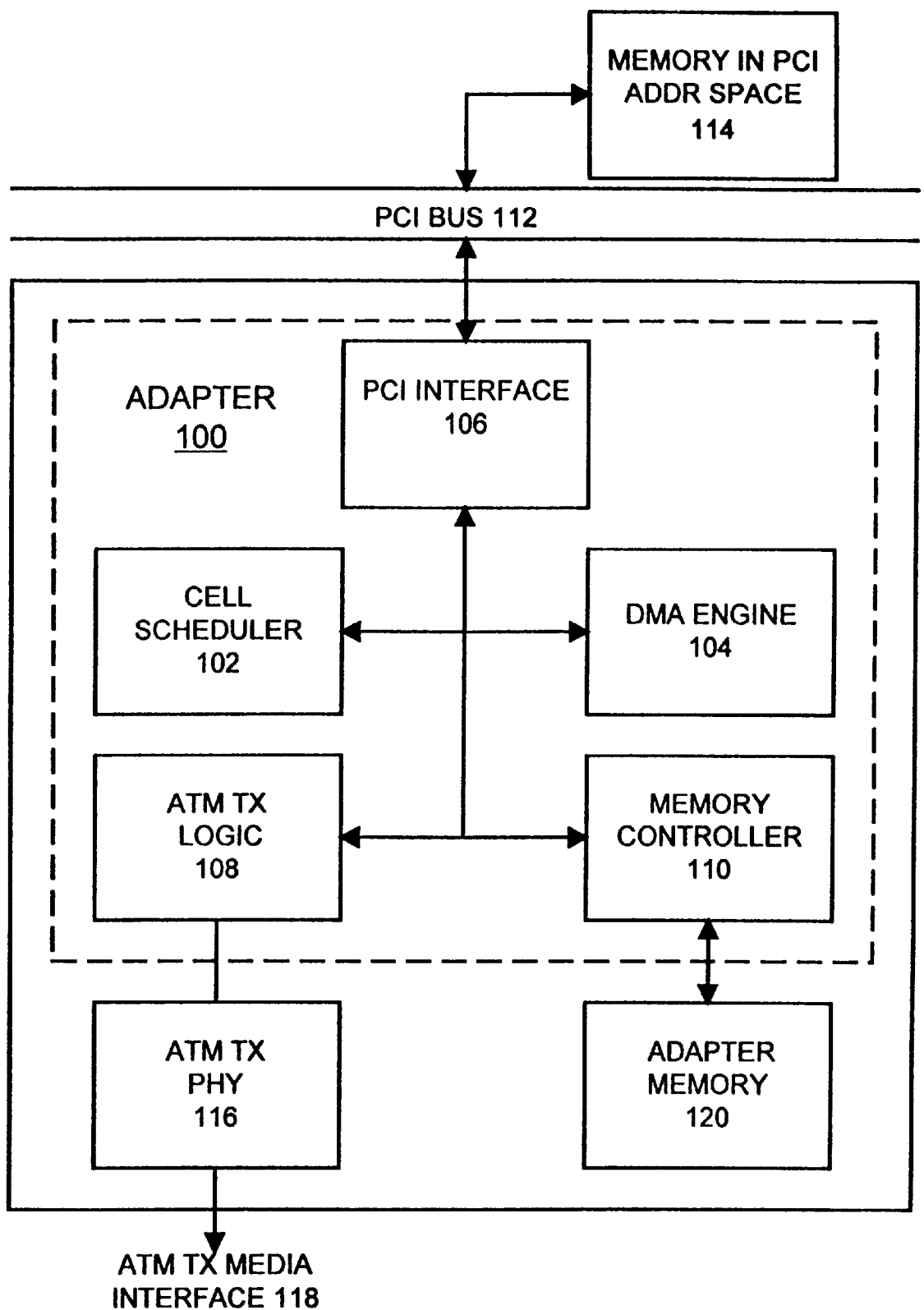
FIG. 1 is a block diagram representation illustrating an adapter for a computer and data communications network system of the preferred embodiment.

Having reference now to the drawings in FIG. 1, there is shown an adapter generally designated by 100 and arranged in accordance with the preferred embodiment. As shown in FIG. 1, adapter 100 includes at least one cell scheduler 102 of the preferred embodiment, a direct memory access (DMA) engine 104, a peripheral component interconnect (PCI) interface 106, an asynchronous transfer mode (ATM) transmission logic 108, and a memory controller 110. The PCI interface 106 is connected to a peripheral component interconnect (PCI) bus 112 coupled to a memory 114 in PCI address space. The ATM transmission logic 108 is connected to an ATM transmission (TX) physical (PHY) layer 116 connected to an ATM TX media interface 118. The memory controller 110 is connected to an adapter memory 120. Adapter 100 provides interface and translator functions between the peripheral component interconnect (PCI) bus 112 and the ATM TX PHY layer 116.

In accordance with features of the invention, cell scheduler 102 schedules a predetermined event or periodic activities utilizing timer descriptors 150 and DMA descriptor block or chain 152, illustrated and described with respect to FIG. 1A.

Referring to FIG. 1A, there is shown a chart illustrating a timer descriptor 150 and a DMA descriptor chain 152 for a periodic activity or a predetermined event used by a cell scheduler 102. The timer descriptor 150 is a data structure which describes a periodic activity or a predetermined event. The timer descriptor 150 includes a pointer or link 154 for linking timer descriptors together at a timing wheel time slot. The timer descriptor 150 can specify two different timer types, relative and absolute. Relative timers expire at a time relative to the current time. Absolute timers expire at a specified time. A timer can be specified to expire once or be enqueued again after it expires. The timer descriptor 150 includes a timer period 156 that specifies the timer period and an expire time 158 that specifies when the timer should expire. The timer descriptor 150 includes a plurality of flags 160 used to specify the type of timer, where the timer is located, a state of the timer. The timer descriptor 150 includes a DMA descriptor address 162 given to the DMA engine 104 when the timer expires.

The DMA descriptors 152 describe data transfers. Each DMA descriptor 152 includes flags 164, a byte count 166, a source address 168 and a destination address 168. Flags 164 are used to specify transfer options, such as the source and destination resource type (memory or register) and options such as checksum accumulation. Byte Count 166 specifies the number of bytes to be transferred. Source Address 168 specifies the source address of the data to be transferred. Destination Address 170 specifies the destination address of the data to be transferred.

In accordance with the preferred embodiment, a predetermined event and periodic activity scheduling mechanism added to the cell scheduler 102 utilizes the timer descriptors 150 to provide several services including single and periodic timers and single and periodic DMAs. By placing the timer descriptor 150 on a timing wheel, an action or predetermined event is scheduled at some time in the future. This action can be periodic or a one time action. The timer descriptors 150 can specify timer events and executing a DMA descriptor chain 152, for example, used to efficiently off-load code and provide needed accurate mechanisms that are required to perform functions such as, timed MPEG data stream splicing.

Having reference to FIG. 2, the cell scheduler 102 is fed by a data enqueue mechanism 202 providing transmission/ processing queues 204 with each queue including the timer descriptor (TDESC) 150 of the preferred embodiment, a logical channel descriptor (LCD) 206, or other such type of logical connection control block. Cell scheduler 102 uses the set of timer descriptors 150 and descriptors 206 that hold the data for each scheduled memory access and data entity. The scheduling selection logic 208 of cell scheduler 102 selects a succession of descriptors 150 and 206 and passes this selected succession to the DMA engine 104 and the ATM transmission logic 108.

Figure 4:
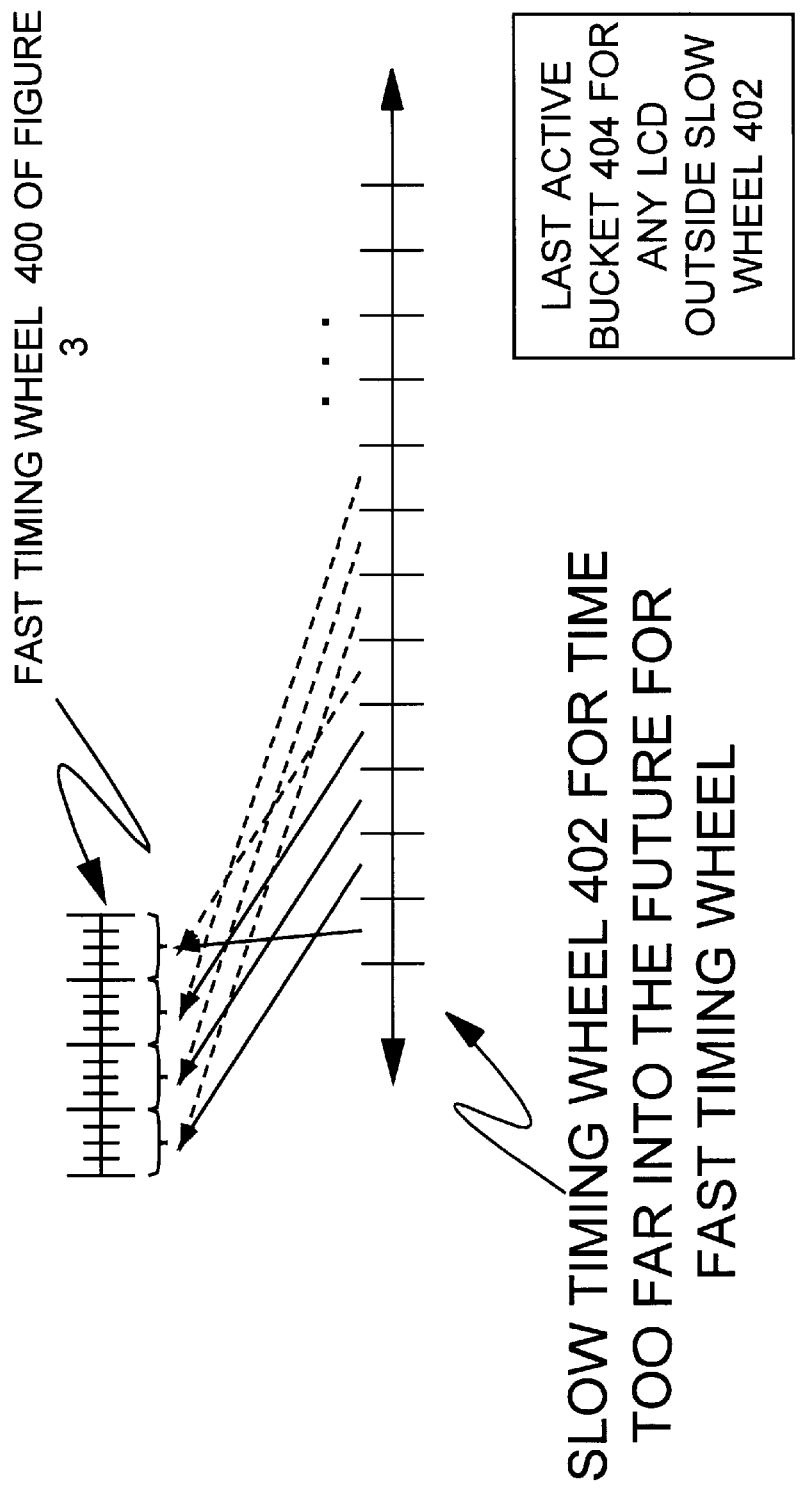
FIG. 4 is a schematic and block diagram representation illustrating fast and slow timing wheels and a last active bucket of the cell scheduler of the preferred embodiment of FIG. 1.

Referring to FIG. 3, the cell scheduler 102 is made up of data structures including, for example, two timing wheels, such as timing wheels 400, 402 illustrated in FIG. 4. As shown in FIG. 3, the data structures include a timing wheel comprising an array 122 of pointers to timer descriptors 150 and LCDs 206 and an occupancy bit map 120 of the timing wheel, comprising a bit for each storage location in the timing wheel. Each bit indicates whether the time wheel slot contains a valid pointer. This bit is used to control the need for reading memory locations and is used to support a fast scan forward. This bit array must be able to be read more than 1 bit at a time. This array of bits can be read as a group of bits at a time. This group of bits will be called a frame. Additionally, the timer descriptors 150 contain the pointer or link 154 that is used to point to the next timer descriptor 150 stored in the same time slot 410, 412 in the time wheel 400, 402. This pointer 154 can be used to create a chain of timer descriptors 150 for each active time slot. Optionally the timing wheel can contain a set of pointers that point to the last entry in the chain of timer descriptors 150 or LCDs. This second pointer can be used for fast insertion to the end of the chain of timer descriptors 150 and/or LCDs 206. While not a required element, this pointer is included in the preferred embodiment.

Having reference to FIG. 4, a fast timing wheel 400 and a slow timing wheel 402 are illustrated. As each slot 410, 412 in each timing wheel 400, 402 corresponds to a range of time, the fast timing wheel 400 is used for smaller ranges of time, and the slow timing wheel 402 is used for larger ranges of time. FIG. 4 illustrates the connections between these wheels 400 and 402, together with a last active bucket 404 used also for any LCDs with intervals greater than the slow timing wheel 402.

Figure 5:
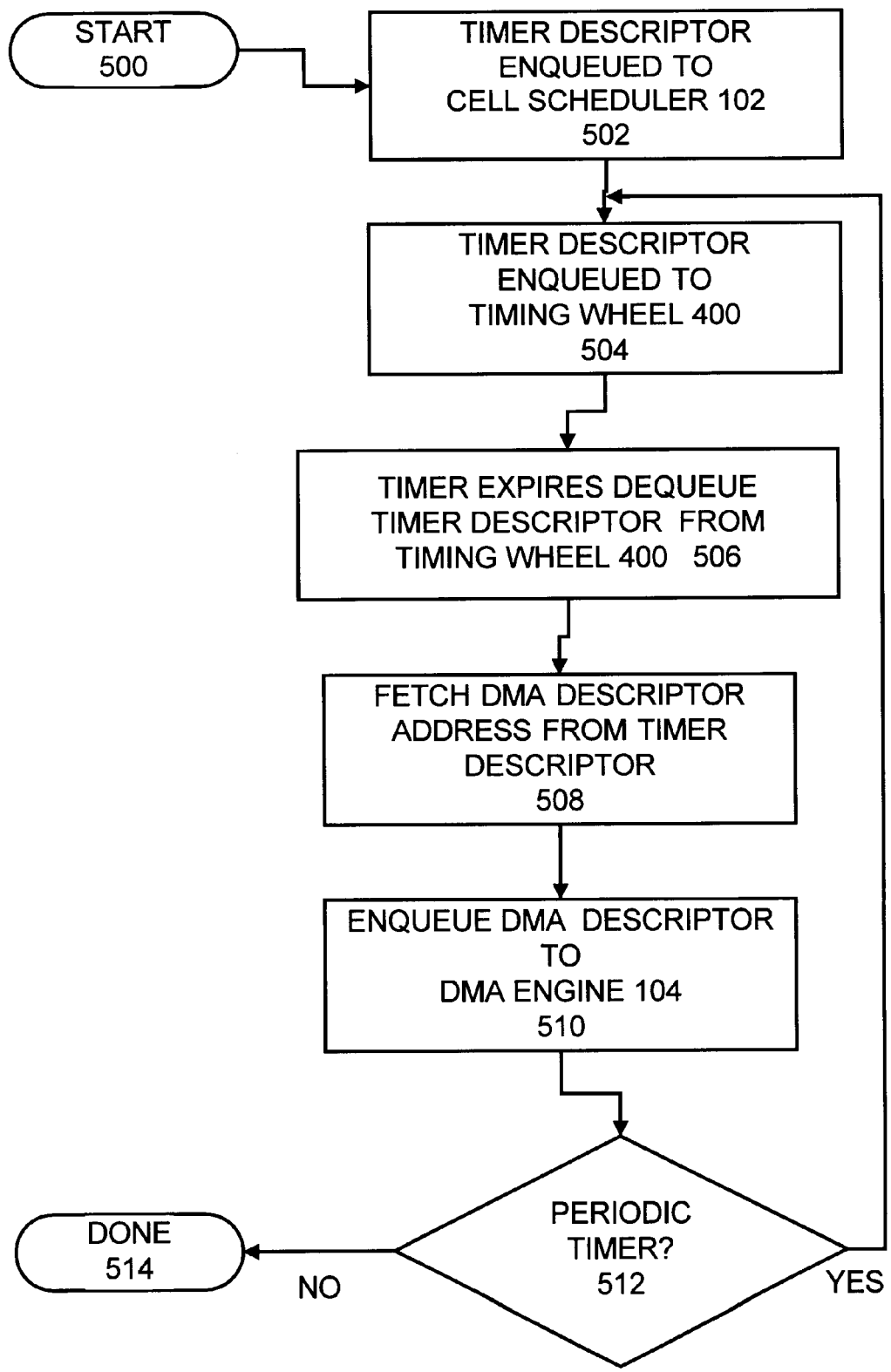
FIG. 5 is a flow chart illustrating sequential operations of the cell scheduler of the preferred embodiment of FIG. 1.

Referring to FIG. 5, sequential operations by the cell scheduler 102 are illustrated starting at a block 500. A timer descriptor 150 enqueued to the cell scheduler 102 is identified as indicated at a block 502. The timer descriptor 150 is enqueued to an appropriate time slot 410, 412 of a timing wheel, such as timing wheel 400 or 402 of FIG. 4, of the cell scheduler 102 as indicated at a block 504. When the timer expires, the timer descriptor 150 is dequeued from the timing wheel as indicated at a block 506. The DMA descriptor address 162 is fetched from the timer descriptor 150 as indicated at a block 508. Then the DMA descriptor 152 is enqueued to the DMA engine 104 for execution as indicated at a block 510. It is determined whether the timer descriptor 150 describes a periodic timer, for example by checking a flag 160, as indicated at a decision block 512. When a periodic timer is identified, then the sequential operations continue returning to block 504 to again enqueue the timer descriptor to a timing wheel time slot. When a periodic timer is not identified at decision block 512, then the sequential operations are completed as indicated at a block 514.

Referring to FIGS. 6A and 6B, charts illustrating operation of timing wheels 400, 402 of the cell scheduler 102 are shown. Each timing wheel 400, 402 consists of a number of memory locations or time slots 410, 412. Each respective time slot 410, 412 represents a unit of time. For example, the time slot 410 may represent 1 microsecond and time slot 412 may represent 8 microseconds. A single counter 600 or a respective counter 600, 602 keeps track of the current time slot for respective timing wheels 400, 402. After a respective programmable period of time corresponding time slots 410, 412, the respective counter 600, 602 advances to the next slot. When the respective counter 600, 602 reaches the end of the timing wheel 400, 402, it wraps back to the beginning of the timing wheel.

Referring to FIG. 6A, a timer descriptor 150 is enqueued to the timing wheel 400 in the time slot that will be processed when the timer descriptor specifies it should expire. When a timer descriptor 150 enqueued to the time slot that is pointed to by the current time counter 600, the timer descriptor 150 is processed. As described with respect to FIG. 5, the processing of timer descriptors 150 involves reading the timer descriptor and passing the address 162 of the DMA descriptor 152 to the DMA engine 104. Processing of the DMA descriptor 152 may include enqueueing it to the timing wheel again.

FIG. 6A represents a 15 slot timing wheel 400 with the current time slot equal to 1 with a timer descriptor 150 #1 enqueued to time slot 4, and timer descriptors 150 #2 and #3 enqueued to time slot 6. If a time slot 410 represents a microsecond, then in 3 microseconds the process described by timer descriptor 150 #1 will be processed. In 5 microseconds timer descriptors 150 #2 and #3 enqueued to time slot 6 will be processed. Multiple timing wheels 400, 402 may be used to provide different time periods and resolutions. Timer descriptors 150 may be transferred from a slow timing wheel 402 to a faster timing wheel 400 to increase accuracy.

Referring to FIG. 6B, fast transmission time slots 410 which may correspond to 1 microsecond and slow time slots 412 which may correspond to 8 microseconds are illustrated. A timer descriptor 150 #1 with an expiration time of 8 microseconds is shown enqueued to slow time slot 412 number 2. On the slow timing wheel 402, time slot number 2 will expire in the same time period as eight slots (0–7) of fast timing wheel 400. Since timing wheel 402 uses 8 times less memory than timing wheel 400, the same accuracy is achieved with the slow timing wheel 402 as with timing wheel 400 with much less memory by rescheduling timer descriptors 150 from timing wheel 402 to timing wheel 400 at the appropriate times.

Figure 7:
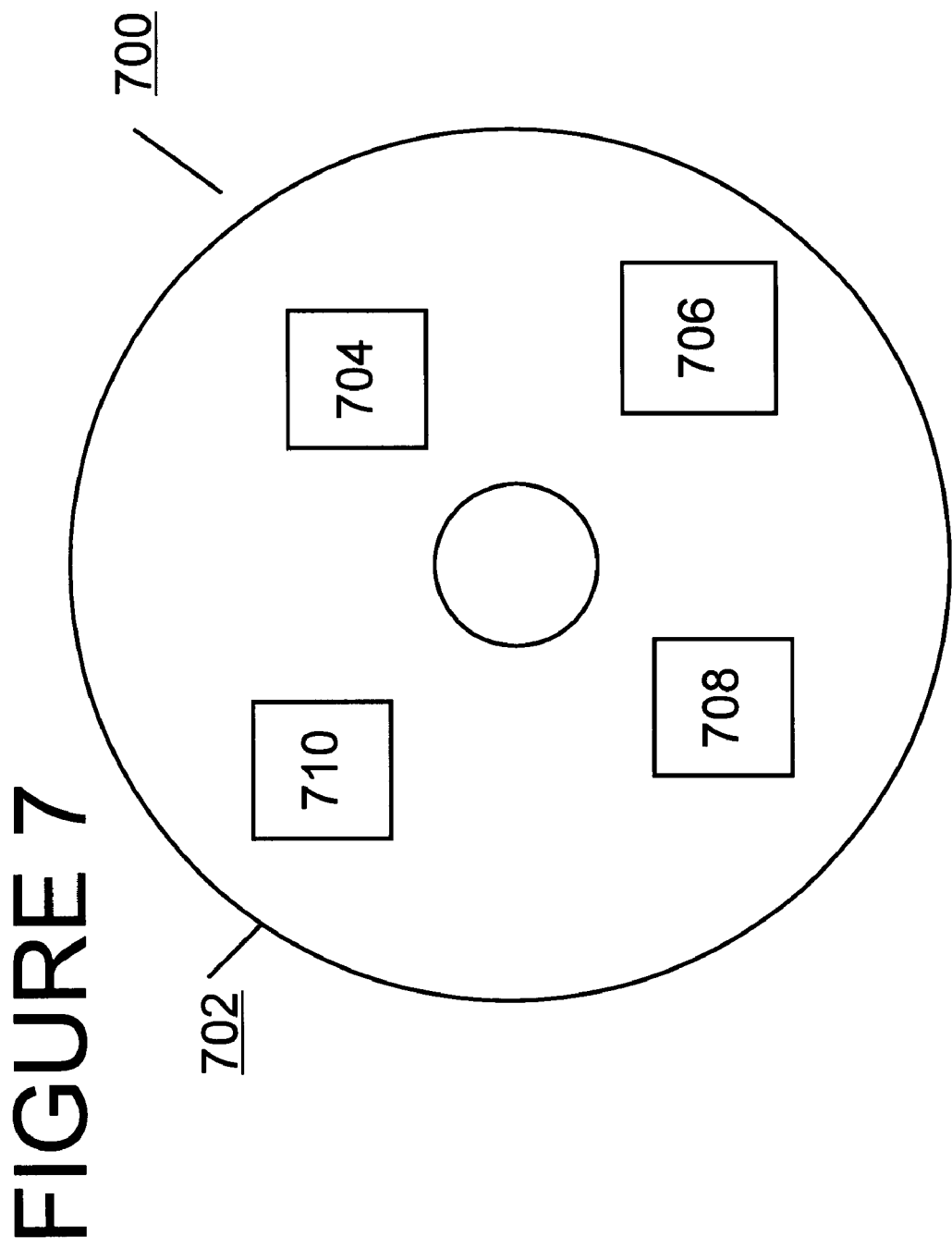
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the scheduling methods for providing periodic activities and predetermined events of the preferred embodiment.

A sequence of program instructions or a logical assembly of one or more interrelated modules defined by the recorded program means 704, 706, 708, 710, direct the cell scheduler 102 for scheduling periodic activities and predetermined events of the preferred embodiment.

While the present invention has been described with reference to the details of the embodiments of the invention shown in the drawing, these details are not intended to limit the scope of the invention as claimed in the appended claims.

What is claimed is:

1. A scheduling method for providing periodic activities and predetermined events comprising the steps of:

enqueuing a timer descriptor to a cell scheduler timing wheel;

providing said timer descriptor with predetermined fields including a flag field indicating a relative or absolute timer type;

identifying a timer expiration for said timer descriptor;

fetching an address for a DMA descriptor from said timer descriptor, and enqueuing said DMA descriptor to a DMA engine to execute said DMA descriptor.

2. A scheduling method for providing periodic activities and predetermined events as recited in claim 1 includes the step of providing a chain of said DMA descriptors.

3. A scheduling method for providing periodic activities and predetermined events as recited in claim 1 includes the step of providing said DMA descriptor with predetermined fields including predetermined flags, a data count value, a source address and a destination address.

4. A scheduling method for providing periodic activities and predetermined events as recited in claim 3 the step of providing said DMA descriptor with predetermined fields describes a data transfer, said data transfer executed by said DMA engine.

5. A scheduling method for providing periodic activities and predetermined events comprising the steps of:

enqueueing a timer descriptor to a cell scheduler timing wheel;

identifying a timer expiration for said timer descriptor;

fetching an address for a DMA descriptor from said timer descriptor, and enqueuing said DMA descriptor to a DMA engine to execute said DMA descriptor; and providing said timer descriptor with predetermined fields including predetermined flags, a timer period, an expiration time, said DMA descriptor address.

6. A scheduling method for providing periodic activities and predetermined events as recited in claim 1 wherein the step of enqueuing said timer descriptor to said cell scheduler timing wheel includes the step of enqueuing said timer descriptor to a time slot in said cell scheduler timing wheel.

7. A scheduling method for providing periodic activities and predetermined events as recited in claim 6 includes the step of providing said timer descriptor with a predetermined link field, said link field for linking said timer descriptor to said time slot.

8. A communication cell scheduler for providing periodic activities and predetermined events comprising:

means for enqueueing a timer descriptor to a cell scheduler timing wheel; said enqueueing means including means for enquuing said timer descriptor to a time slot in said cell scheduler timing wheel;

means for identifying a timer expiration for said timer descriptor;

means for fetching an address for a DMA descriptor from said timer descriptor, and means for enqueueing said DMA descriptor to a DMA engine to execute said DMA descriptor.

9. A communication cell scheduler for providing periodic activities and predetermined events as recited in claim 8 wherein said timer descriptor includes predetermined fields including a link, a timer period, an expiration time, predetermined flags, and said DMA descriptor address.

10. A communication cell scheduler for providing periodic activities and predetermined events as recited in claim 8 wherein said DMA descriptor describes a data transfer and includes predetermined fields including a data byte count, a source address, a destination address and predetermined flags.

11. A communication cell scheduler for providing periodic activities and predetermined events as recited in claim 10 wherein said data transfer is executed by said DMA engine.

12. A computer program product for use with a communication cell scheduler, the computer product comprising a recording medium having instructions stored on the recording medium to cause the communications cell scheduler to perform the steps of:

enqueuing a timer descriptor to a cell scheduler timing wheel;

providing said timer descriptor with predetermined fields including a flag field indicating a relative or absolute timer type;

identifying a timer expiration for said timer descriptor;

fetching an address for a DMA descriptor from said timer descriptor, and enqueuing said DMA descriptor to a DMA engine to execute said DMA descriptor.

13. A computer program product for use with a communication cell scheduler as recited in claim 12 wherein said timer descriptor includes predetermined fields including a link, a timer period, an expiration time, predetermined flags, and said DMA descriptor address.

14. A computer program product for use with a communication cell scheduler as recited in claim 12 wherein said DMA descriptor describes a data transfer and includes predetermined fields including a data byte count, a source address, a destination address and predetermined flags.

* * * * *